(12) United States Patent
Ozawa

(10) Patent No.: US 8,693,536 B2
(45) Date of Patent: Apr. 8, 2014

(54) SERVER APPARATUS, COMMUNICATION METHOD AND PROGRAM

(75) Inventor: Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 621 days.

(21) Appl. No.: 12/995,210

(22) PCT Filed: May 29, 2009

(86) PCT No.: PCT/JP2009/059854
§ 371 (c)(1),
(2), (4) Date: Nov. 30, 2010

(87) PCT Pub. No.: WO2009/145293
PCT Pub. Date: Dec. 3, 2009

(65) Prior Publication Data
US 2011/0188568 A1 Aug. 4, 2011

(30) Foreign Application Priority Data

May 30, 2008 (JP) ................. 2008-142744

(51) Int. Cl.
*G06F 15/16* (2006.01)
*H04N 11/06* (2006.01)
(52) U.S. Cl.
USPC ............ 375/240.06; 375/240.07; 375/240.12; 375/240.28; 709/236; 709/239; 709/221
(58) Field of Classification Search
None
See application file for complete search history.

(56) References Cited

U.S. PATENT DOCUMENTS

| | | | | |
|---|---|---|---|---|
| 6,252,873 B1* | 6/2001 | Vines | ............................ | 370/389 |
| 6,453,175 B2* | 9/2002 | Mizell et al. | .................. | 455/560 |
| 6,483,945 B1* | 11/2002 | Kato | ............................ | 382/236 |
| 7,472,197 B2* | 12/2008 | Li et al. | ......................... | 709/231 |
| 7,571,246 B2* | 8/2009 | Virdi et al. | ..................... | 709/232 |
| 7,606,303 B2* | 10/2009 | Nemiroff et al. | ........ | 375/240.01 |
| 8,331,382 B2* | 12/2012 | Shiba | ........................... | 370/401 |
| 8,406,222 B2* | 3/2013 | Moriwaki et al. | ............ | 370/352 |
| 2006/0073843 A1* | 4/2006 | Aerrabotu et al. | ............ | 455/519 |
| 2006/0227864 A1 | 10/2006 | Miyamoto et al. | | |
| 2007/0156924 A1* | 7/2007 | Ramalingam et al. | ........ | 709/246 |
| 2008/0100694 A1* | 5/2008 | Barkley et al. | ............. | 348/14.08 |
| 2008/0140851 A1* | 6/2008 | Weigand et al. | ............. | 709/231 |
| 2008/0170563 A1 | 7/2008 | Zhu et al. | | |
| 2008/0175273 A1* | 7/2008 | Johansson et al. | ............ | 370/473 |

(Continued)

FOREIGN PATENT DOCUMENTS

| | | | |
|---|---|---|---|
| CN | 1691806 A | 11/2005 | |
| CN | 1801810 A | 7/2006 | |

(Continued)

OTHER PUBLICATIONS

Chinese Office Action for CN200980120095.8 dated Aug. 28, 2012.

(Continued)

*Primary Examiner* — Sath V Perungavoor
*Assistant Examiner* — Matthew J Anderson
(74) *Attorney, Agent, or Firm* — Sughrue Mion, PLLC

(57) ABSTRACT

Disclosed is a server apparatus including a conversion unit which, in case another terminal takes part anew in a group of terminals, during a time of transmitting the copied stream or packet, converts a video frame to a non-predictive frame and transmits the non-predictive frame and transmits a video signal following the non-predictive frame, as it is.

18 Claims, 7 Drawing Sheets

(56) References Cited

U.S. PATENT DOCUMENTS

| | | | |
|---|---|---|---|
| 2008/0195698 A1* | 8/2008 | Stefanovic et al. | 709/203 |
| 2009/0055540 A1* | 2/2009 | Foti et al. | 709/228 |
| 2009/0207918 A1* | 8/2009 | Fan et al. | 375/240.23 |
| 2009/0325561 A1* | 12/2009 | Xu et al. | 455/416 |

FOREIGN PATENT DOCUMENTS

| | | | |
|---|---|---|---|
| CN | 1893427 A | | 1/2007 |
| CN | 1960525 A | | 5/2007 |
| CN | 200710001164.1 | * | 7/2007 |
| CN | 101079720 A | | 11/2007 |
| CN | 101159928 A | | 4/2008 |
| JP | 2002297496 A | | 10/2002 |
| JP | 2002305733 A | | 10/2002 |
| JP | 2002314972 A | | 10/2002 |
| JP | 2004272631 A | | 9/2004 |
| JP | 2005124193 A | | 5/2005 |
| JP | 2005303711 A | | 10/2005 |
| JP | 2006031337 A | | 2/2006 |
| JP | 2006519525 A | | 8/2006 |
| JP | 2006295586 A | | 10/2006 |
| JP | 2007053487 A | | 3/2007 |
| JP | 2007068078 A | | 3/2007 |
| JP | 2007251345 A | | 9/2007 |
| JP | 2008005254 A | | 1/2008 |
| JP | 2008079061 A | | 4/2008 |
| JP | 2008206039 A | | 9/2008 |

OTHER PUBLICATIONS

Japanese Office Action for JP2011-518454 mailed on Nov. 6, 2012.
International Search Report for PCT/JP2009/059854 mailed Jul. 7, 2009.

* cited by examiner

SERVER APPARATUS, COMMUNICATION METHOD AND PROGRAM

REFERENCE TO RELATED APPLICATION

This application is the National Phase of PCT/JP2009/059854, filed May 29, 2009, which is based upon and claims the benefit of the priority of Japanese patent application No. 2008-142744, filed on May 30, 2008, the disclosure of which is incorporated herein in its entirety by reference thereto.

FIELD OF THE INVENTION

This invention relates to a server apparatus and a communication method. More particularly, it relates to a server apparatus, a communication method and a program in which at least two terminals take part to form a group of terminals and in which a stream or a packet containing a video signal is received from a first terminal, copied and sent to a terminal(s) other than the first terminal.

BACKGROUND

With the extended bandwidth and increased operating speed of a mobile communication network, services or distribution using packet communication may be expected to be increasing. Under these situations, a service in which, when two or more (for example, an N-number of) terminals take part together to form a group of terminals, packet data sent from a first terminal is received and copied and the so copied data are sent to (N−1) terminals other than the first terminal, have already been commenced under the name of PoC (Push to talk over Cellular) insofar as speech is concerned.

In time to come, similar services targeted for a video signal (video PoC or video sharing) are expected to be commenced with the progress of IMS (IP Multimedia Subsystem).

In this case, a video signal is compression-encoded on a terminal side in order to transmit a signal with high efficiency at a low bit rate. Examples of known schemes include ITU-T (International Telecommunication Union Telecommunication Standardization Section) Recommendations H.263 and MPEG-4 (Moving Picture Experts Group phase 4) internationally standardized by ISO/IEC (International Organization for Standardization/International Electrotechnical Commission).

With the H.264/MPEG-4 AVC (Advanced Video Coding), internationally standardized by ITU-T and ISO/IEC, a moving picture signal may be transmitted more efficiently than is possible with the aforementioned moving picture compression encoding scheme.

As a system for media distribution, there is disclosed in Patent Document 1, a configuration in which a server, relaying multimedia communication data, converts multimedia communication data into an output video information, matched to the media reproduction capability of a receiving terminal, before transmitting the information to the receiving terminal. There is also disclosed in Patent Document 2 a configuration in which the encoded information in need of a larger display capability is converted into the encoded information capable of being displayed with a preset display capability, and both the original encoded information and the converted encoded information are provided by a data server apparatus on a local area network. A contents information reproduction terminal acquires the encoded information (multimedia data) matched to its own display level along with a decoding program for reproduction. There is disclosed in Patent Document 3 a configuration of a multi-cast network in which, on detection of change of a channel request that specifies a requested channel corresponding to a multi-cast group, a retained intra-frame of the requested channel is transmitted by way of uni-cast communication. Patent Document 4 discloses a configuration in which, if a content requested is issued by a client, a server apparatus converts the format, by its self, responsive to the contents. If the server apparatus is unable to convert the format, but there is another server apparatus which is able to do so, the server apparatus may request another server apparatus to convert the format, and to transmit the converted format to the client.

As a system for posting an advertisement, there is disclosed in Patent Document 5, a configuration in which an advertisement in a broadcast data stream is identified, and in which an advertisement in a broadcast program in a broadcast data stream, and an advertisement schedule, inclusive of the information for identifying the location of advertisement, are updated. In reproduction, an advertisement or an alternative advertisement is posted in the above location or in a further location in the program. In the Patent Documents 1 to 5, there are disclosed configurations completely different from the configuration of a server apparatus in which at least two terminals take part to form a group of terminals, a stream or a packet, containing a video signal, is received from a first one of the terminals and copied, and in which the stream or packet, thus copied, is transmitted to those terminals that are different from the first terminal.

[Patent Document 1] JP Patent Kokai Publication No. JP-P2002-297496A
[Patent Document 2] JP Patent Kokai Publication No JP-P2004-272631A
[Patent Document 3] JP Patent Kokai Publication No. JP-P2005-124193A
[Patent Document 4] JP Patent Kokai Publication No. JP-P2008-5254A
[Patent Document 5] JP-Patent Kohyo Publication. No. JP-P2006-519525A

SUMMARY

The entire disclosures of Patent Documents 1 to 5 are incorporated herein by reference thereto. The following is an analysis from the standpoint of the present invention. The video PoC or video sharing, dealing with the video signal, has the following problems:

(a) In case a terminal performs compression encoding of a video signal or video contents, using the aforementioned compression-encoding scheme, the common practice is to introduce a non-predictive frame, termed an I-frame, only at the leading end of contents. I-frames are inserted periodically every several seconds on only extremely rare occasions. For another terminal, newly taking part in the group halfway, an I-frame is not inserted at the time point of the terminal taking part in the group. Hence, if the terminal decodes and reproduces the encoded signal, the picture reproduced is disturbed.

(b) If a variety of sorts of terminals exist in a group of terminals, it may sometimes occur that decoding and reproduction of given contents are possible at certain terminals, but are not possible at other terminals, depending on particular formats of the contents.

If these problems arise, the video may be unable to be decoded or reproduced at a terminal or, if the video can be decoded or reproduced, it remains disturbed for some time duration, as a result of which the services rendered are out of order.

It is therefore an object of the present invention to provide a server apparatus, method and program, in which the server apparatus receives a stream, at least containing a video signal from a first one of a plurality of, that is, two or more, terminals, taking part to form a group of terminals, copies the stream and transmits the copied stream to terminals other than the first terminal, in which such problem as picture quality deterioration is not generated at a terminal newly taking part in the group.

It is another object of the present invention to provide a server apparatus, method and program, in which, even in case a variety of different terminals with respective different sorts of the information on capability co-exist in the same group, such problem as picture quality deterioration is not generated at the terminal side.

In one aspect of the present invention, there is provided a server apparatus which receives a stream or a packet transmitted from a first terminal of a plurality of terminals that take part to form a group of terminals, the stream or packet transmitted including at least a video signal. The server apparatus, which copies part or all of the stream or packet received to form an as-copied stream or packet, and transmits the copied stream or packet to a remaining one or more of the terminals other than the first terminal, comprises a conversion unit which, in case other terminal takes part anew in the group of terminals, during a time of transmitting the copied stream or packet, converts a video frame to a non-predictive frame and transmits the non-predictive frame to the other terminal, the conversion unit transmitting a video frame following the non-predictive frame using an original non-converted stream or packet as it is.

According to the present invention, there is also provided a server apparatus which receives a stream or a packet transmitted from a first terminal of a plurality of terminals that take part to form a group of terminals, the stream or packet transmitted including at least a video signal. The server apparatus, which copies part or all of the stream or packet received to form an as-copied stream or packet, and transmits the copied stream or packet to a remaining one or more of the terminals other than the first terminal, comprises a conversion unit which, in case there is one or more terminals in the group of terminals that is or are not adapted to cope with a format of the stream or packet, converts the format to a file format capable of being coped with by the one or more terminals, the conversion unit transmitting the stream or packet of the so converted format.

According to the present invention, there is also provided a server apparatus which receives a stream or a packet transmitted from a first terminal of a plurality of terminals that take part to form a group of terminals, the stream or packet transmitted including at least a video signal. The server apparatus, which copies part or all of the stream or packet received to form an as-copied stream or packet, and transmits the copied stream or packet to a remaining one or more of the terminals other than the first terminal, comprises a conversion unit which receives information on capability of the terminals of the group of terminals, the conversion unit converting the video signal, in case the information on capability of one or more terminals other than the first terminal differs from the information on capability of the first terminal, so that the information on capability of the one or more terminals meets with the information on capability of the first terminal, the conversion unit then transmitting the converted video signal to the one or more terminals.

According to the present invention, there is also provided a server apparatus which receives a stream or a packet transmitted from a first terminal of a plurality of terminals that take part to form a group of terminals, the stream or packet transmitted including at least a video signal. The server apparatus, which copies part or all of the stream or packet received to form an as-copied stream or packet, and transmits the copied stream or packet to a remaining one or more of the terminals other than the first terminal, comprises a conversion unit performing at least one of:
inserting at least one of the other video and the other audio;
synthesizing a plurality of videos; and
superimposing one or more characters;
at a timing before or after the stream or packet transmitted or at an optional timing,
the conversion unit transmitting the stream or packet copied.

In another aspect of the present invention, there is provided a method for communication wherein a server apparatus receives a stream or a packet transmitted from a first terminal of a plurality of terminals taking part to form a group of terminals, the stream or packet transmitted including at least a video signal, wherein the method comprises:

the server apparatus copying part or all of the stream or packet received and transmitting the copied stream or packet to one or more of the terminals different from the first terminal;

in case other terminal newly takes part in the group of terminals, during a time of transmitting the copied stream or packet, the server apparatus converting a video frame to a non-predictive frame, and transmitting the non-predictive frame to the other terminal; and the server apparatus transmitting a video frame following the non-predictive frame using an original non-converted stream or packet as it is.

According to the present invention, there is provided a method for communication in which a server apparatus receives, a stream or a packet transmitted from a first terminal of a plurality of terminals taking part to form a group of terminals, the stream or packet transmitted including at least a video signal, wherein the method comprises:

the server apparatus copying part or all of the stream or packet received and transmitting the copied stream or packet to one or more of the terminals different from the first terminal; and in case one or more terminals in the group of terminals is or are not adapted to cope with a format of the stream or packet, the server apparatus converting the format to a file format capable of being coped with by the one or more terminals and transmitting the stream or packet of the so converted format to the one or more of terminals.

According to the present invention, there is provided a method for communication wherein a server apparatus receives a stream or a packet transmitted from a first terminal of a plurality of terminals taking part to form a group of terminals, the stream or packet transmitted including at least a video signal wherein the method comprises:

the server apparatus copying part or all of the stream or packet received and transmitting the copied stream or packet to one or more of the terminals different from the first terminal;

the server apparatus receiving information on capability of the terminals of the group of terminals; and the server apparatus converting the video signal, in case the information on capability of one or more terminals other than the first terminal differs from the information on capability of the first terminal, so that the information on capability of the one or more terminals meets with the information on capability of the first terminal and transmitting the converted video signal to the one or more terminals.

According to the present invention, there is also provided a method for communication wherein a server apparatus receives a stream or a packet transmitted from a first terminal of a plurality of terminals taking part to form a group of terminals, the stream or packet transmitted including at least a video signal, wherein the method comprises:

the server apparatus copying part or all of the stream or packet received and transmitting the copied stream or packet to one or more of the terminals different from the first terminal;

the server apparatus performing at least one of:
inserting at least one of the other video and the other audio;
synthesizing a plurality of videos; and
superimposing one or more characters;
at a timing before or after the stream or packet transmitted or at an optional timing; and
the server apparatus transmitting the stream or packet copied.

In yet another aspect of the present invention, there is provided a program that causes a computer constituting a server apparatus to execute conversion processing, the server apparatus receiving a stream or a packet transmitted from a first terminal of a plurality of terminals taking part to form a group of terminals, the stream or packet transmitted including at least a video signal, the server apparatus copying part or all of the stream or packet received and transmitting the copied stream or packet to a remaining one or more of the terminals other than the first terminal, wherein the conversion processing comprises converting, in case another terminal newly takes part in the group of terminals, during the time the copied stream or packet is transmitted, and in case the server apparatus transmits the copied stream or packet to the other terminal, a video frame to a non-predictive frame, and transmitting the non-predictive frame to the other terminal; and transmitting a video frame following the non-predictive frame using an original non-converted stream or packet as it is. There is also provided a computer-readable recording medium storing the program according to the present invention.

According to the present invention, there is also provided a program that causes a computer constituting a server apparatus to execute conversion processing, the server apparatus receiving a stream or a packet transmitted from a first terminal of a plurality of terminals taking part to form a group of terminals, the stream or packet transmitted including at least a video signal, the server apparatus copying part or all of the stream or packet received and transmitting the copied stream or packet to a remaining one or more of the terminals other than the first terminal, wherein the conversion processing comprises converting, in case there is one or more terminals in the group of terminals that is or are not adapted to cope with the format of the stream or packet, the format to a file format capable of being coped with by the one or more terminals, and transmitting the stream or packet of the so converted format to the one or more terminals. There is also provided a computer-readable recording medium storing the program according to the present invention.

According to the present invention, there is also provided a program that causes a computer constituting a server apparatus to execute conversion processing, the server apparatus receiving a stream or a packet transmitted from a first terminal of a plurality of terminals taking part to form a group of terminals, the stream or packet transmitted including at least a video signal, the server apparatus copying part or all of the stream or packet received and transmitting the copied stream or packet to a remaining one or more of the terminals other than the first terminal, wherein the conversion processing comprises:

receiving information on capability of the terminals of the group of terminals; and converting the video signal, in case the information on capability of one or more terminals other than the first terminal differs from the information on capability of the first terminal, so that the information on capability of the one or more terminals meets, with the information on capability of the first terminal and transmitting the converted video signal to the one or more terminals. There is also provided a computer-readable recording medium storing the program according to the present invention.

According to the present invention, there is also provided a program that causes a computer constituting a server apparatus to execute conversion processing, the server apparatus receiving a stream or a packet transmitted from a first terminal of a plurality of terminals taking part to form a group of terminals, the stream or packet transmitted including at least a video signal, the server apparatus copying part or all of the stream or packet received and transmitting the copied stream or packet to a remaining one or more of the terminals other than the first terminal, the conversion processing comprising:

performing at least one of:
inserting at least one of the other video and the other audio;
synthesizing a plurality of videos; and
superimposing one or more characters;
at a timing before or after the stream or packet transmitted or at an optional timing; and transmitting the stream or packet copied. There is also provided a computer-readable recording medium storing the program according to the present invention.

According to the present invention, if a new terminal has taken part in the group in the course of a session, no problem such as picture quality deterioration is produced on the terminal side, because the function for conversion is provided on the server side. The present invention provides for the above result without the need to remodel the terminal.

According to the present invention, should a variety of terminals with differing sorts of the information on capability co-exist in the same group, no problem such as picture quality deterioration is produced on the terminal side, because the function for conversion is provided on the side of a server. The present invention provides for the above result without the need to remodel the terminal.

According to the present invention, new services may be rendered by providing the server side with the functions of conversion, such as the functions of introducing other pre-stored video contents at an optional timing to a video stream sent from a mobile terminal, synthesizing these to a sole picture image, or superimposing one or more characters. The present invention provides for the above result without the need to remodel the terminal.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED MODES

Exemplary embodiments of the present invention will now be described in detail. In exemplary embodiments that follow, an example configuration in which video (moving picture) is used as example contents and a transcoder function is provided in a conversion unit of a server apparatus, is described. However, a similar configuration may also be used in case the contents are audio or speech.

Figure 1:
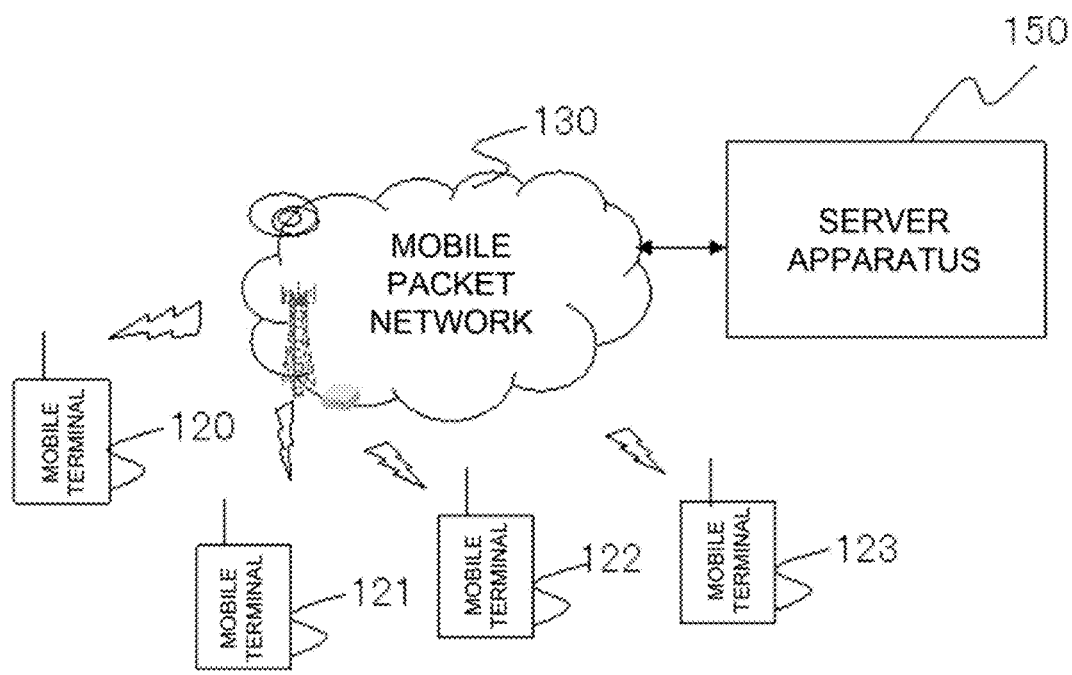
FIG. 1 is a diagram showing a connection configuration of a server apparatus and mobile terminals according to the present invention.

FIG. 1 shows an example of the connection configuration of a server apparatus and a plurality of mobile terminals in a mobile packet network. FIG. 1 shows the case in which the number N of participant terminals of a group is four so that four mobile terminals 120 to 123 constitute a group of terminals and are connected to a mobile packet network 130.

A server apparatus 150 is connected to the mobile packet network 130 to exchange video packets with the mobile terminals 120 to 123 via the mobile packet network 130.

In a video PoC service or a video sharing service, one of the mobile terminals 120 to 123 takes the initiative at a given timing. The mobile terminal that has so taken the initiative, such as the terminal 120, transmits a video packet to the server apparatus 150.

The server apparatus 150 determines, using a SIP (Session Initiation Protocol) signal or an RTCP (RTP Control Protocol) signal, which of the terminals of the same group has taken the initiative. The server apparatus 150 then receives a packet from the terminal that has taken the initiative, copies and transmits the packet to the other terminals, here the mobile terminals 121 to 123. As regards details of the SIP, reference may be made to RFC (Requests For Comments) 3261 of the IETF (Internet Engineering Task Force) and, as regards details of the RTCP, reference may be made to IETF RFC 1889.

<Exemplary Embodiment1>

Figure 2:
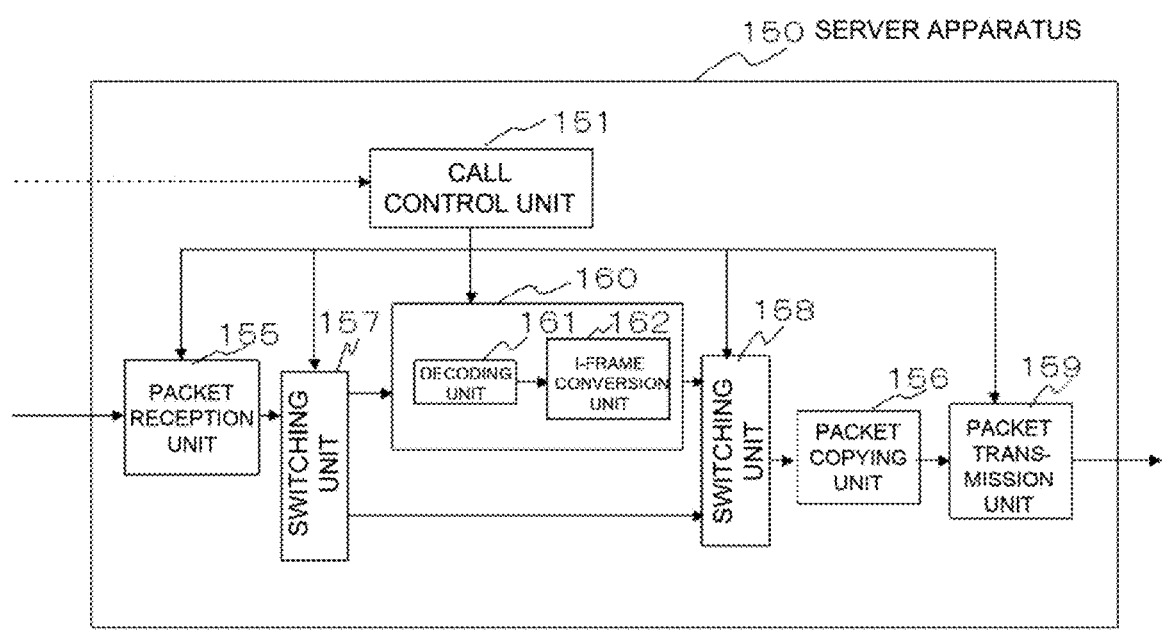
FIG. 2 is a block diagram showing a configuration of a first exemplary embodiment of a server apparatus according to the present invention.

FIG. 2 is a block diagram showing a configuration of an exemplary embodiment 1 of the server apparatus 150 of FIG. 1. In FIG. 2, it is assumed that a terminal, taking the initiative, transmits that effect to the server apparatus 150 using the SIP.

It is however also possible for the terminal, taking the initiative, to transmit that effect to the server apparatus 150 using any suitable means other than SIP, such as RTCP.

Referring to FIG. 2, the server apparatus 150 includes a call control unit 151, a packet reception unit 155, a switching unit 157, a conversion unit 160, a switching unit 158, a packet copying unit 156 and a packet transmission unit 159. The conversion unit 160 includes a decoding unit 151 and an I-frame conversion unit 162.

The call control unit 151 receives, from a mobile terminal by a SIP signal, information including the number (N) of mobile terminals belonging to the same group and an IP address (or a telephone number) of each mobile terminal;

a terminal taking the initiative in the same group (an IP address or a telephone number);

the timing of participation of each mobile terminal into the group; and a session initiation command and a session disconnection command.

The call control unit 151 also receives the information on capability of each mobile terminal using the SDP (Session Description Protocol). For details of the SDP, reference may be made to IETF RFC 2327.

The operation for a case where an N-number of mobile terminals takes part in the group at the session initiation and no mobile terminal takes part in the course of the session. The operation for this operation is termed 'an operation (1)'.

On receipt of a session initiation command by the SIP, the call control unit 151 instructs the packet reception unit 155 to receive an RTP packet from the mobile terminal (here the mobile terminal 120), which takes the initiative, and informs the packet reception unit 155 of a transmission source IP address of the mobile terminal 120.

The packet reception unit 155 receives the RTP packet, transmitted from the IP address of the transmission source, and outputs the RTP packet to the switching unit 157.

Since no mobile terminal is taking part in the course of the session, the call control unit 151 instructs the switching unit 157 to output all packets to the switching unit 158 in a through mode.

The call control unit 151 also instructs the switching unit 158 to output all packets to the packet copying unit 156. So, the switching unit 158 outputs all packets to the packet copying unit 156.

The packet copying unit 156 copies as many RTP packets received from the switching unit 158 as there are the terminals other than the terminal taking the initiative, that is, takes an (N−1)-number of copies, and outputs the resulting copies to the packet transmission unit 159.

The packet transmission unit 159 is instructed by the call control unit 151 to initiate the session, at the same time as it is advised by the call controlled 151 of the IP address of the mobile terminal of the transmission destination. Accordingly, the packet transmission unit 159 transmits (N−1) copies of the input RTP packets it has received to (N−1) mobile terminals.

The above sequence of operations is repeated as from the time of notification of the session initiation command from the call control unit 151 until notification of the session end command.

The operation when a new mobile terminal has taken part in the group in the course of the session will now be described. This operation is termed the 'operation (2)'. The operation until the new mobile terminal takes part in the group is the same as with the above-described operation (1).

If there is such a mobile terminal that has newly taken part in the group in the course of the session, the call control unit 151 receives a SIP signal for connection from the mobile terminal to recognize that there is a terminal that takes part halfway in the group.

On receipt of the SIP signal from the new terminal, the call control unit 151 transmits a command to the switching unit 157, conversion unit 160 and the switching unit 158.

The switching unit 157, receiving the packets from the packet reception unit 155, changes over its operation so that it outputs an M-number of RTP packets, contained in a video frame directly following the reception of the command, to the conversion unit 160, while outputting the (M+1)st and subsequent RTP packets to the switching unit 158.

The conversion unit 160 includes the decoding unit 161 and the I-frame conversion unit 162, as described above. The conversion unit inputs an M-number of RTP packets from the switching unit 157, and transforms the video frame in question into a non-predictive frame or an intra-frame (I-frame) to output the so generated I-frame.

Specifically, the decoding unit 161 reads and decodes a video frame from each of the M-number of the RTP packets contained in the video frame.

The decoding unit 161 outputs the decoded video frame to the I-frame conversion unit 162. The I-frame conversion unit 162 stores the stream transformed into an I-stream, in an RTP packet to output the resulting RTP packet to the switching unit 158.

The switching unit 158 receives the M-number of the RIP packets, directly after receipt of the command from the call control unit 151, from the conversion unit 160, while receiving the (M+1)st packet et seq. from the switching unit 157. The switching unit 157 output the packets to the packet copying unit 156.

The packet copying unit 156 receives the RTP packets and copies an (N−1)-number of each of the RTP packets to output the resulting copies to the packet transmission unit 159.

The packet transmission unit 159 is instructed by the call control unit 151 to initiate the session, while being informed of the IP addresses of the (N−1)-number of the mobile terminals as the transmission destination. The packet transmission unit 159 then delivers the input RTP packets to the (N−1)-number of the mobile terminals.

In the present embodiment, the packet copying unit 156 is arranged on a succeeding stage of the switching unit 158. Alternatively, the packet copying unit 156 may be arranged on a preceding stage of the switching unit 157 to prepare an (N−1)-number of packet copies at the outset to cause part of each packet to pass through the conversion unit 160 for conversion to an I-frame. With such configuration, the number of packets to be transformed into I-frames is increased by (N−1)-times.

In the above embodiment, there is no limitation to the type of the video compression-encoding scheme. For example, any suitable compression-encoding scheme, such as H.263, MPED-4 or H.264, may be used.

The configuration as well as the operation of the server apparatus 150 has been described above as the first exemplary embodiment. The operation of the present server apparatus corresponds to an embodiment of the method for communication according to the present invention. That is, the present communication method includes a step of the server apparatus (150) receiving a stream or a packet which contains at least a video signal and which is transmitted from a first terminal of a plurality of terminals taking part in forming a group of terminals, such as a terminal (120);

a step of the server apparatus (150) copying part or all of the streams or packets received and transmitting the so copied stream or packet to those of the multiple terminals that are different from the first terminal; and a step of the server apparatus (150) converting, when another terminal newly takes part in the group in the course of transmitting the copied stream or packet, a video frame into a non-predictive frame, in transmitting the copied stream or packet to the other terminal and transmitting video frames following the non-predictive frame, as non-converted original streams or packets.

It goes without saying that the conversion unit or other parts (in FIG. 2, the conversion unit 150, the call control unit 151, packet reception unit 155, switching units 157 and 158, packet copying unit 156 and the packet transmission unit 159) of the server apparatus 150 may have their processing or functions implemented by a program executed on a computer that constitutes the server apparatus 150. There, is also provided a computer-readable recording medium storing the program. The same applies for any of the following exemplary embodiments.

<Exemplary Embodiment2>

Figure 3:
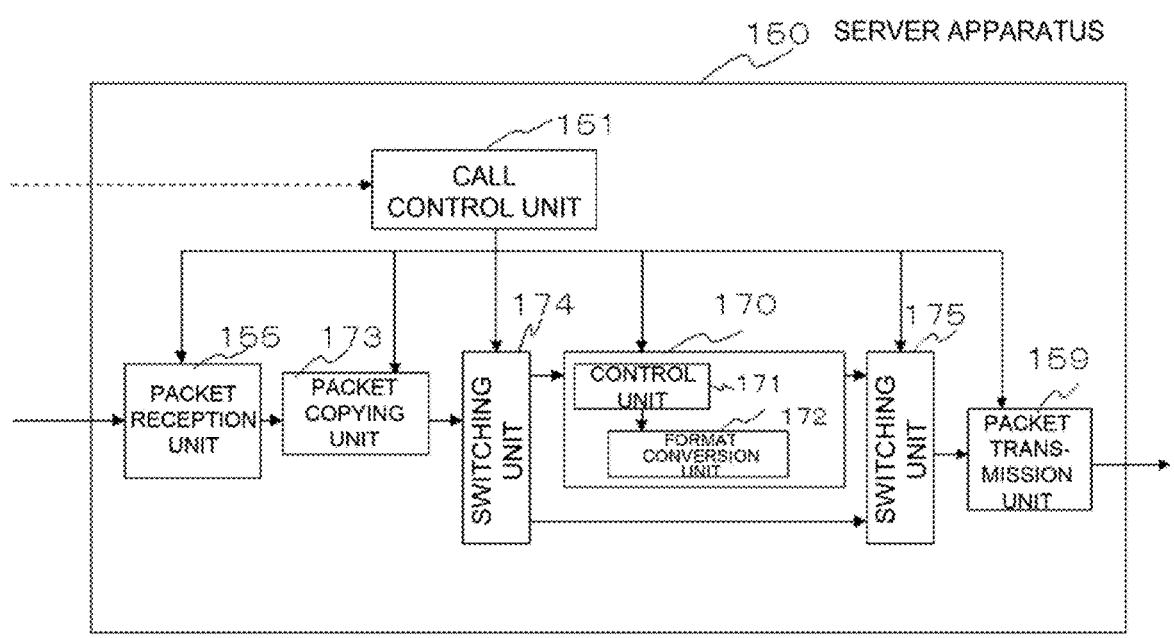
FIG. 3 is a block diagram showing the configuration of a second exemplary embodiment of a server apparatus according to the present invention.

FIG. 3 shows a configuration of a second exemplary embodiment of the present invention. In FIG. 3, the same reference numerals are used to designate the same components as those of FIG. 2, and the corresponding description of these common components is dispensed with, because these perform the same operation.

A packet copying unit 173 creates (N−1) copy packets for each of RTP packets, received by the packet reception unit 155, and provides the so generated copy packets to a switching unit 174.

The switching unit 174 operates under a command from the call control unit 151 and is informed of the number P of terminals, out of the N-number of the terminals belonging to the same group, that are unable to receive streams contained in the RTP packet transmitted from the terminal taking the initiative. The switching unit 174 outputs a P-number of copy packets, out of the (N−1)-number of the copy packets, to a conversion unit 170.

The switching unit 174 transmits the remaining (N−1−P)-number of the packets to a switching unit 175 in a through mode.

A conversion unit 170 includes a control unit 171 and a format conversion unit 172. The control unit 171 receives the information on capability, stated in SDP and transmitted from each of the N-number of the terminals, and compares respective information contents to one another. By this comparison, the conversion unit 171 sorts the terminals into an (N−1−P)-number of the terminals that are capable of receiving, the RTP streams and a P-number of the terminals that are not. As regards the P-number of the terminals that are incapable of receiving the RTP streams, the conversion unit 171 checks whether or not these terminals are capable of receiving the streams if these streams are converted from the RTP stream format to a file format, such as 3GP file format or a 3GP2 file format.

If it is determined that the streams, converted as described above, is able to be received, a command is issued to the format conversion unit 172 by way of notification that the RTP stream format is to be converted to the 3GP file format, for instance.

The format conversion unit 172 receives the format for conversion from the control unit 171 and performs the processing of converting the format of the RTP stream, received from the switching unit 174, into a 3GP file format. The stream of the 3GP file format is partitioned into predetermined sizes and stored in an RTP payload so as to be then output to the switching unit 175.

As for details of the 3GP file format, reference may be made to the TS26.244 standard by 3GPP.

The switching unit 175 receives the P-number of the RTP packets, output from the conversion unit 170, and the (N−1−P)-number of the RTP packets, output from the switching unit 174, to output the received packets as (N−1) packets to the packet transmission unit 159.

As the second exemplary embodiment, the configuration as well as the operation of the server apparatus 150 has been described above. The operation of the server apparatus corresponds to the second exemplary embodiment of the communication method of the present invention. That is, this communication method includes a step of the server apparatus (150) receiving a stream or a packet which contains at least a video signal and is transmitted from a first terminal, such as a terminal (120), out of a plurality of terminals taking part in forming a group of terminals;

a step of the server apparatus (150) copying part or all of the streams or packets received and transmitting the so copied stream or packet to those of the multiple terminals that are different from the first terminal; and a step of the server apparatus (150) converting, in case one or more terminals in the group is unable to receive the stream format or the packet format, the stream or the packet into a file format capable of being received by such terminal(s), and transmitting the so converted stream or packet.

<Exemplary Embodiment3>

Figure 4:
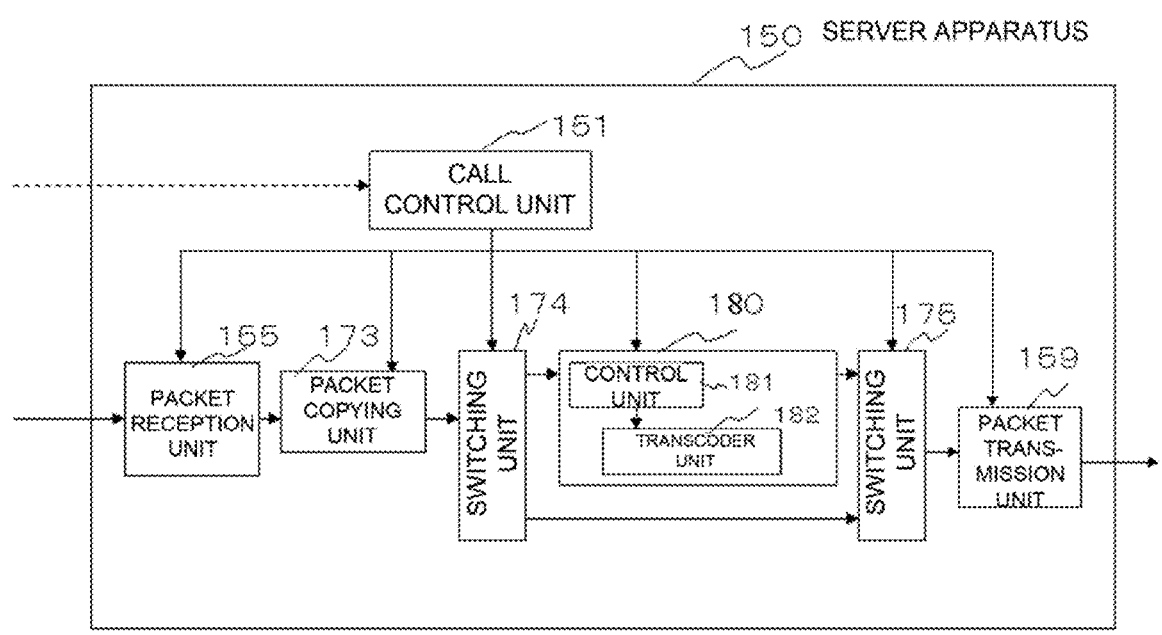
FIG. 4 is a block diagram showing the configuration of a third exemplary embodiment of a server apparatus according to the present invention.

FIG. 4 shows a configuration of a third exemplary embodiment of the present invention. In FIG. 4, the same reference numerals are used to depict the same components as those of FIG. 2, and the corresponding description of these common components is dispensed with, because these perform the same operation.

A conversion unit 180 is made up of a control unit 181 and a transcoder unit 182. The control unit 181 receives the information on capability from the call control unit 151. The information on capability has been stated in the SDP and sent in this state from each of the N-number of the terminals. The conversion unit 180 compares the information on capability A of the mobile terminal taking the initiative with that of the other (N−1) terminals to decide on the terminal(s) whose information on capability is not coincident with the information on capability A.

It is assumed that there is a P-number of terminals whose information on capability is not coincident with the information on capability A. The sorts of the information on capability, referred to for giving the decision, may be exemplified by, for example, video compression-encoding scheme;

bit rate;

image size;

frame rate and so forth.

The conversion unit 180 further decides on a conversion scheme with which coincidence of each sort of the information on capability of the terminal whose information on capability is non-coincident with the information on capability A is assured. The conversion unit then notifies transcoder unit 182 of the so determined valid conversion scheme.

The transcoder unit 182 is notified of the conversion scheme valid for the P-number of terminals the information on capability of which is non-coincident with the information on capability A. The transcoder unit extracts a stream from each of the P-number of RTP packets received from the switching unit 174. The transcoder unit 182 then carries out conversion in accordance with the above-described conversion scheme, and causes the converted stream to be stored in more or more RTP packets to output the resulting packets to the switching unit 175.

On the other hand, the (N−1−P)-number of the RTP packets, having the information on capability coincident with the information on capability A, are supplied to the switching unit 175 in a through mode.

With the present embodiment, there is no limitation to the type of the video compression-encoding scheme. That is, the present embodiment may cope with any video compression-encoding schemes, such as H.263, MPEG-4 or H.264. The information on capability may be of sorts other than those stated above.

As the third exemplary embodiment, the configuration as well as the operation of the server apparatus 150 has been described above. The operation of the server apparatus corresponds to the third exemplary embodiment of the method for communication of the present invention. That is, the present communication method includes:

a step of the server apparatus (150) receiving a stream or a packet which contains at least a video signal and which is transmitted from a first terminal of a plurality of terminals taking part in forming a group of terminals, such as a terminal (120), a step of the server apparatus (150) copying part or all of the streams or packets received and transmitting the so copied stream or packet to those terminals that are different from the first terminal;

a step of the server apparatus (150) receiving information on capability of the terminals included in the group, and a step of the server apparatus (150) converting, in case the information on capability of the terminal(s) other than the first terminal differs from the information on capability of the first terminal, the information on capability of the video signal into matching with that of the first terminal and transmitting the so converted video signal to the terminals) in question.

<Exemplary Embodiment4>

Figure 5:
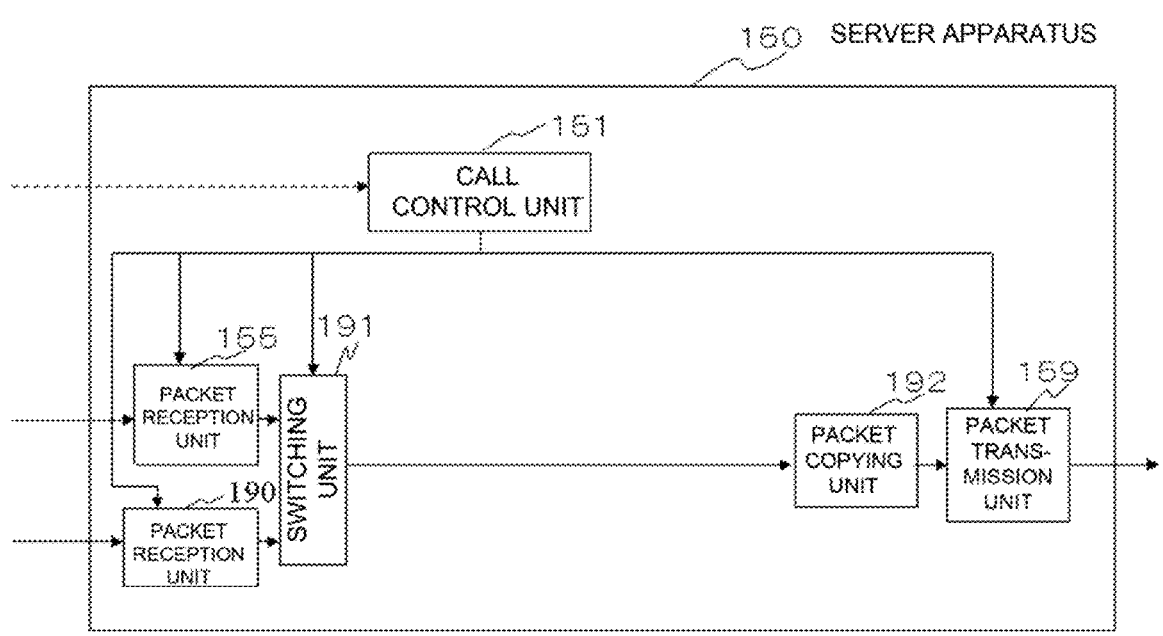
FIG. 5 is a block diagram showing the configuration of a fourth exemplary embodiment of a server apparatus according to the present invention.

FIG. 5 shows a configuration of a fourth exemplary embodiment of the present invention. In FIG. 5, the same reference numerals are used to designate the same components as those of FIGS. 2, 3 and 4, and the corresponding description of these common components is dispensed with because these perform the same operation.

Referring to FIG. 5, a packet reception unit 190 and a switching unit 191 receive commands from the call control unit 151, at a time of a session initiation;

at an arbitrary timing during a session; or immediately before a session end.

Other video contents or RTP packets for pre-stored video contents, from a contents server, not shown, or a contents storage server, also not shown, are also received and output to the switching unit 191.

It is thus possible to introduce other video contents, stored video contents or advertisement video contents into RTP packets from the mobile terminal taking the initiative, at timing as instructed by the call control unit 151.

In FIG. 5, it is possible to add a conversion unit.

<Exemplary Embodiment5>

Figure 6:
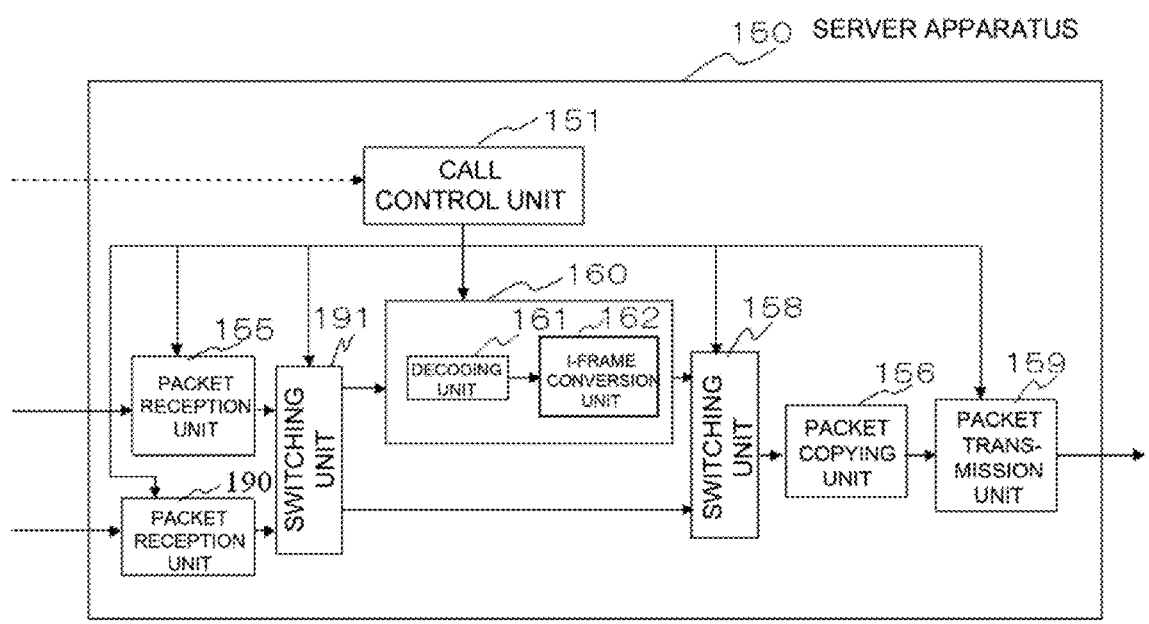
FIG. 6 is a block diagram showing the configuration of a fifth exemplary embodiment of a server apparatus according to the present invention.

FIG. 6 shows a configuration of a fifth exemplary embodiment 5 of the present invention. In this exemplary embodiment, a conversion unit 160, explained with reference to FIG. 2, is added to the configuration of FIG. 5. With the configuration of FIG. 6, a moving picture, which is free of deterioration and includes other video contents, may be displayed even on a mobile terminal that has newly taken part into the group in the course of a session.

Meanwhile, the conversion unit 170 or the conversion unit 180, shown respectively in FIG. 3 or 4, may, of course, be used in place of the conversion unit 160. Telop characters may also be inserted in place of video contents.

<Exemplary Embodiment6>

Figure 7:
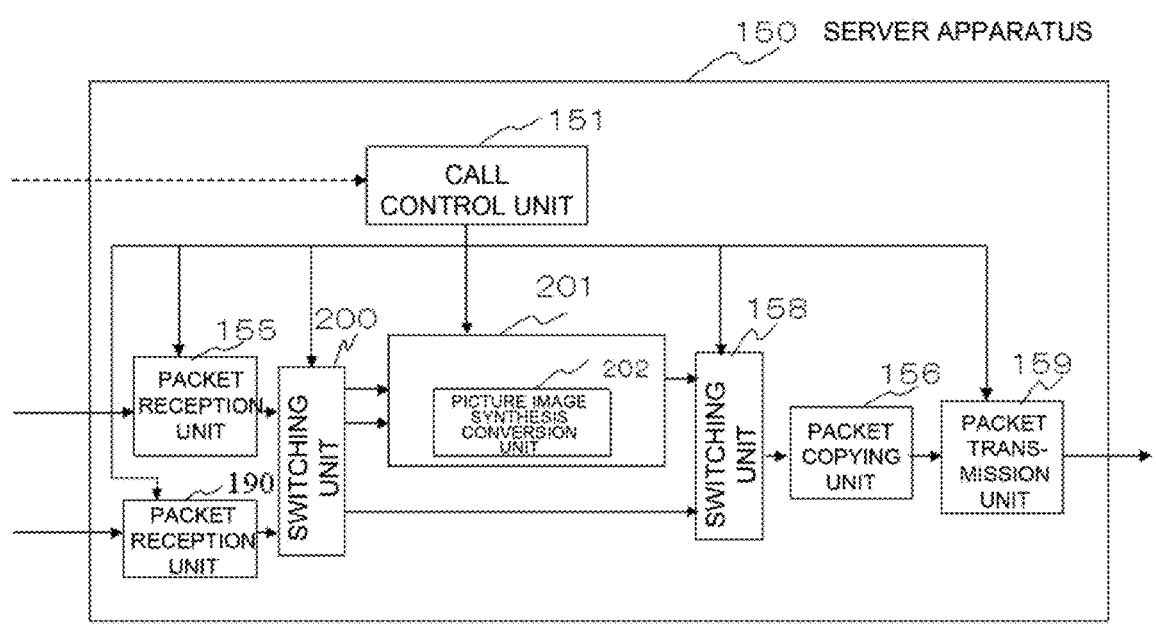
FIG. 7 is a block diagram showing the configuration of a sixth exemplary embodiment of a server apparatus according to the present invention.

FIG. 7 shows a configuration of a sixth exemplary embodiment of the present invention. The present exemplary embodiment shows the configuration for a case where a video RTP packet, another RTP packet of video contents, an RIP packet of stored video contents, or an RTP packet of advertisement video contents, from a mobile terminal taking the initiative are synthesized together into one picture image and delivered as output.

A switching unit 200 inputs RTP packets from a packet reception unit 155 and a packet reception unit 190, at a timing of receipt of an instruction for picture image synthesis from the call control unit 151, and outputs the so received packets to a conversion unit 201.

Also, at a timing of receipt of a command for release of picture image synthesis, the switching unit outputs the RTP packet from the packet reception unit 155 to the switching unit 158.

At a timing of receipt of a command for picture image synthesis from the call control unit 151, a picture image synthesis conversion unit 202 of the conversion unit 201 proceeds to transcoding for synthesizing a plurality of, herein two, picture images into one picture image, and outputs the resulting picture image to the switching unit 158.

The configuration as well as the operation of the server apparatus 150 has been described as the fourth to sixth exemplary embodiments. The operation of the server apparatus 150 is in meeting with respective exemplary embodiments of the method for communication according to the present invention. This communication method includes:

a step of the server apparatus (150) receiving a stream or a packet which contains at least a video signal and which is transmitted from a first terminal of a plurality of terminals taking part in forming a group of terminals, such as a terminal (120);

a step of the server apparatus (150) copying part or all of the stream or packet received and transmitting the so copied stream or packet to those of the multiple terminals that are different from the first terminal; and a step of the server apparatus (150) performing at least one of the operation of inserting at least one of the other video and the other audio, the operation of synthesizing a plurality of videos and the operation of overlaying characters at a timing before or after transmitting the stream or packet or at an arbitrary timing and then transmitting the stream or the packet copied.

In each of the above-described exemplary embodiments, the call control unit, performing the C-Plane (Control-Plane) processing, on one hand, and the packet reception unit, conversion unit and the packet transmission unit, performing the U-Plane (User-Plane) processing, on the other hand, are arranged in the server apparatus. Alternatively, the C-plane processing and the U-plane processing may separately be carried out on respective different apparatus, in which case it is possible to cause the C-Plane and the U-plane may each to have scalability, independently.

Although FIG. 6 shows the configuration corresponding to combination of the first exemplary embodiment of FIG. 2 and the fourth exemplary embodiment of FIG. 5, it is also possible to provide for combination of Exa1 with at least one of Examples 2 and 3. In addition, it is of course possible to provide optional combinations of Examples 1 to 4.

The operation and effect of the above embodiments will now be described.

Such a server apparatus may be provided in which another terminal, newly taking part in a group of terminals halfway during the time of a given session, may be accommodated based on the function of conversion provided on the server side. It is possible to eliminate problems, such as picture quality deterioration, on the terminal side without the necessity of remodeling the terminal.

In case a variety of different terminals, having different information on capability sorts, should exist together in one and the same group, it is possible to eliminate problems, such as picture quality deterioration, based on the function of conversion provided on the server side, without the necessity of remodeling the terminal.

It is also possible to render new services without the necessity of remodeling the terminal by affording a variety of functions of conversion. These functions of conversion may include introducing pre-stored separate video contents at an optional timing to a video stream sent from a mobile terminal, synthesizing the video contents and the video stream in one picture image, synthesizing a plurality of video streams into one picture image, and overlaying characters on the picture image.

The disclosures of the aforementioned Patent Documents are incorporated by reference herein. The particular exemplary embodiments or examples may be modified or adjusted within the gamut of the entire disclosure of the present invention, inclusive of claims, based on the fundamental technical concept of the invention. Further, variegated combinations or selections of the elements disclosed herein may be made within the framework of the claims. That is, the present invention may encompass various modifications or corrections that may occur to those skilled in the art within the gamut of the entire disclosure of the present invention, inclusive of claim and the technical concept of the present invention.

What is claimed is:

1. A server apparatus comprising:

a reception unit that receives a stream or a packet transmitted from a first terminal of a plurality of terminals that take part to form a group of terminals, the stream or packet transmitted including at least a video signal;

copying unit configured to take copies of the packet received from a second switching unit;

a transmission unit configured to receive the copied packets from the copying unit and to transmit the copied packets to remaining one or more of the terminals other than the first terminal;

a call control unit configured to issue, upon reception of a session initiation signal from a terminal taking part anew in a course of a session, a command indicative of the other terminal taking part anew;

a first switching unit configured to receive the packet from the reception unit, the first switching unit, upon reception of the command from the call control unit, during a time of the copied packets being transmitted in the session, changing over to output to a conversion unit M-number of packets corresponding to a video frame directly following the reception of the command from the call control unit, M being a predetermined positive integer, the first switching unit outputting from (M+1)th and onward packets subsequent to the M-number of packets to the second switching unit;

the conversion unit configured to receive the M-number of packets from the first switching unit and decode the video frame, the conversion unit converting the decoded video frame to a non-predictive frame to supply the converted non-predictive frame packetized in M-number of packets to the second switching unit; and the second switching unit configured to receive, from the conversion unit, the M-number of the packets including the converted non-predictive frame directly after reception of the command from the call control unit, while receiving, from the first switching unit, the packets from (M+1)th and onward, the second switching unit outputting the packets received from the conversion unit and the first switching unit to the copying unit.

2. The server apparatus according to claim 1, wherein the conversion unit, when there is one or more terminals in the group of terminals that is or are not adapted to cope with a format of the stream or packet, converts the format to a file format capable of being coped with by the one or more terminals and the transmission unit transmits the stream or packet of the so converted format to the one or more terminals.

3. The server apparatus according to claim 1, wherein the call control unit receives information on capability of the terminals of the group of terminals, wherein the conversion unit converts the video signal, in case the information on capability of one or more terminals other than the first terminal differs from the information on capability of the first terminal, so that the information on capability of the one or more terminals meets with the information on capability of the first terminal, and then the transmission unit transmits the converted video signal to the one or more terminals.

4. The server apparatus according to claim 1, wherein the conversion unit performs at least one of:
inserting at least one of the other video and the other audio;
synthesizing a plurality of videos; and
superimposing one or more characters;
at a timing before or after the stream or packet transmitted or at an optional timing.

5. The server apparatus according to claim 1, wherein the conversion unit, in case there is one or more terminals in the group of terminals that is or are not adapted to cope with a format of the stream or packet, converts the format to a file format capable of being coped with by the one or more terminals, and
the transmission unit transmits the stream or packet of the so converted format.

6. The server apparatus according to claim 1, wherein the conversion unit receives information on capability of the terminals of the group of terminals, converts the video signal, in case the information on capability of one or more terminals other than the first terminal differs from the information on capability of the first terminal, so that the information on capability of the one or more terminals meets with the information on capability of the first terminal, and
the transmission unit transmits the converted video signal to the one or more terminals.

7. A method for communication wherein a server apparatus receives a stream or a packet transmitted from a first terminal of a plurality of terminals taking part to form a group of terminals, the stream or packet transmitted including at least a video signal, the method comprising:
a call control process of the server apparatus, upon reception of a session initiation signal from a terminal taking part anew in a course of a session, a command indicative of the other terminal taking part anew;
a first switching process of the server apparatus, upon reception of the command from the call control process, during a time of copied packets being transmitted in the session, changing over to output a conversion process of the server apparatus M-number of received packets corresponding to a video frame directly following the reception of the command from the call control process, M being a predetermined positive interger, the first switching process outputting from (M+1)th and onward packets subsequent to the M-number of packets to a second switching process of the server apparatus;

the conversion process receiving the M-number of packets from the first switching process to decode the video frame, and converting the decoded video frame to a non-predictive frame supply the converted non-predictive frame packetized in M-number of packets to the second switching process;

the second switching process receiving, from the conversion process, the M-number of the packets including the converted non-predictive frame, directly after reception of the command from the call control process, while receiving, from the first switching process, the packets from (M+1)th and onward, the second switching process outputting the packets received from the conversion process and the first switching process o a copying process of the server apparatus;

the copying process taking copies of the packet received from the second switching process; and a transmission process of the server apparatus transmitting the copied packets to remaining one or more terminals other than the first terminal.

8. The method for communication according to claim 7, comprising
in case one or more terminals in the group of terminals is or are not adapted to cope with the format of a stream or packet,
the server apparatus converting the format to a file format capable of being coped with by the one or more terminals, and transmitting the stream or packet of the so converted format to the one or more terminals.

9. The method for communication according to claim 7, comprising:
the server apparatus receiving information on capability of the terminals of the group of terminals; and
the server apparatus converting the video signal, in case the information on capability of one or more terminals other than the first terminal differs from the information on capability of the first terminal, so that the information on capability of the one or more terminals meets with the information on capability of the first terminal, and transmitting the converted video signal converted to the one or more terminals.

10. The method for communication according to claim 7, comprising
the server apparatus performing at least one of:
inserting at least one of the other video and the other audio;
synthesizing a plurality of videos; and
superimposing one or more characters;
is carried out at a timing before or after the stream or packet transmitted or at an optional timing, and
the server apparatus transmitting the stream or packet copied.

11. The method for communication according to claim 7, comprising:
in case one or more terminals in the group of terminals is or are not adapted to cope with a format of the stream or packet, the server apparatus converting the format to a file format capable of being coped with by the one or more terminals and transmitting the stream or packet of the so converted format to the one or more of terminals.

12. The method for communication according to claims 7, comprising:
the server apparatus receiving information on capability of the terminals of the group of terminals; and
the server apparatus converting the video signal, in case the information on capability of one or more terminals other than the first terminal differs from the information on capability of the first terminal, so that the information on capability of the one or more terminals meets with the information on capability of the first terminal and transmitting the converted video signal to the one or more terminals.

13. A non-transitory computer-readable recording medium storing a computer-program that causes a computer constituting a server apparatus to execute processing comprising:
receiving a stream or a packet transmitted from a first terminal of a plurality of terminals taking part to form a group of terminals, the stream or packet transmitted including at least a video signal;
a call control process issuing, upon reception of a session initiation signal from a terminal taking part anew in a course of a session, a command indicative of the other terminal taking part anew;
a first switching process, upon reception of the command from the call control process, during a time of the copied packets being transmitted in the session, changing over to output to a conversion process M-number of received packets corresponding to a video frame directly following the reception of the command from the call control process, M being a predetermined positive integer, the first switching process outputting from (M+1)th and onward packets subsequent to the M-number of packets to a second switching process;
the conversion process receiving the M-number of packets from the first switching process to decode the video frame, and converting the decoded video frame to a non-predictive frame to supply the converted non-predictive frame packetized in M-number of packets to the second switching process;
the second switching process receiving, from the conversion process, the M-number of the packets including the converted non-predictive frame, directly after reception of the command from the call control process, while receiving, from the first switching process, the packets from (M+1)th and onward, the second switching process outputting the packets received from the conversion process and the first switching process to a copying process;
the copying process receiving the packet from the second switching process to take copies of the packet received; and
a transmission process receiving the copied packets from the copying process to transmit the copied packets to remaining one or more terminals other than the first terminal.

14. The non-transitory computer-readable recording medium according to claim 13, storing a computer-program that causes the computer to perform processing comprising:
converting the format to a file format capable of being coped with by one or more terminals, in case there is the one or more terminals in the group of terminals that is or are not adapted to cope with the format of the stream or packet; and
transmitting the stream or packet of the so converted format to the one or more terminals.

15. The non-transitory computer-readable recording medium according to claim 13, storing a computer-program that causes the computer to execute the conversion processing comprising:
converting the video signal so that information on capability of one or more terminals the first terminal meets with the information on capability of the first terminal, in case the information on capability of the one or more terminals other than the first terminal differs from the information on capability of the first terminal; and
transmitting the converted video signal to the one or more terminals.

16. The non-transitory computer-readable recording medium according to claim 13, causing the computer to perform the conversion processing comprising:
performing
at least one of
inserting at least one of the other video and the other audio;
synthesizing a plurality of videos; and
superimposing one or more characters; at a timing before or after the stream or packet transmitted or at an optional timing; and
transmitting the copied stream or packet.

17. The non-transitory computer-readable recording medium according claim 13, storing a computer-program that causes the computer to execute conversion processing comprising
converting, in case there is one or more terminals in the group of terminals that is or are not adapted to cope with the format of the stream or packet, the format to a file format capable of being coped with by the one or more terminals, and transmitting the stream or packet of the so converted format to the one or more terminals.

18. The non-transitory computer-readable recording medium according claim 13, storing a computer-program that causes the computer to execute conversion processing comprising:
receiving information on capability of the terminals of the group of terminals; and
converting the video signal, in case the information on capability of one or more terminals other than the first terminal differs from the information on capability of the first terminal, so that the information on capability of the one or more terminals meets with the information on capability of the first terminal and transmitting the converted video signal to the one or more terminals.

* * * * *